US006771902B1

(12) United States Patent
Trick

(10) Patent No.: US 6,771,902 B1
(45) Date of Patent: Aug. 3, 2004

(54) SEALED PACKAGE OF FILM FOR PRODUCING FRAMED PHOTOGRAPHS

(76) Inventor: Robert T. Trick, 2600 Henry Hudson Pkwy., Bronx, NY (US) 10463

( * ) Notice: Subject to any disclaimer, the term of this patent is extended or adjusted under 35 U.S.C. 154(b) by 1825 days.

(21) Appl. No.: 08/100,019

(22) Filed: Jul. 30, 1993

(51) Int. Cl.[7] .......................... G03B 17/24; G03B 41/00
(52) U.S. Cl. ...................................... 396/316; 396/335
(58) Field of Search ................................ 354/110, 120, 354/296; 396/332, 333, 334, 335, 336, 337, 338, 339, 340, 545, 315, 316

(56) References Cited

U.S. PATENT DOCUMENTS

| | | | | | |
|---|---|---|---|---|---|
| 1,933,953 | A | * | 11/1933 | Ames ........................ | 396/335 |
| 4,304,471 | A | * | 12/1981 | Jones ........................ | 396/337 |
| 4,827,291 | A | * | 5/1989 | Guez ......................... | 396/335 |
| 4,894,671 | A | * | 1/1990 | Wheeler ..................... | 396/337 |
| 4,994,832 | A | * | 2/1991 | Spector ..................... | 354/110 |
| 5,111,224 | A | * | 5/1992 | Spector ..................... | 354/125 |
| 5,142,311 | A | * | 8/1992 | Olson et al. ................ | 354/120 |
| 5,187,512 | A | * | 2/1993 | Kirkendall .................. | 354/120 |
| 5,187,518 | A | * | 2/1993 | Kitagawa .................... | 355/40 |
| 5,189,467 | A | * | 2/1993 | Wheeler ..................... | 354/110 |

* cited by examiner

Primary Examiner—Christopher Mahoney
(74) Attorney, Agent, or Firm—Norris McLaughlin & Marcus

(57) ABSTRACT

A sealed package of film to be opened, put into a camera and exposed to form a plurality of photographs, comprising a plurality of film items to be exposed, each film item comprising a first unexposed portion and a second exposed portion, whereby upon exposure of the first unexposed portion and development there is formed in said first portion a picture corresponding to the exposure alongside a picture corresponding to the second portion.

15 Claims, 2 Drawing Sheets

SEALED PACKAGE OF FILM FOR PRODUCING FRAMED PHOTOGRAPHS

The present invention relates to a novel sealed package of film suitable for producing photographs having a predetermined portion, e.g. a predetermined border.

It is known to produce photographs a of FIG. 1, having a "frame" c of FIG. 1, surrounding faces of individuals. Such self-framed photographs are made by relatively complex procedures, available only to professionals.

It is an object of the present invention to provide a way for amateurs to produce photographs including a frame or other portion of predetermined content, independent of the photograph obtained by conventional exposure.

BRIEF DESCRIPTION OF THE DRAWINGS

The present invention will now be described with reference to the drawings, wherein.

Figure 1:
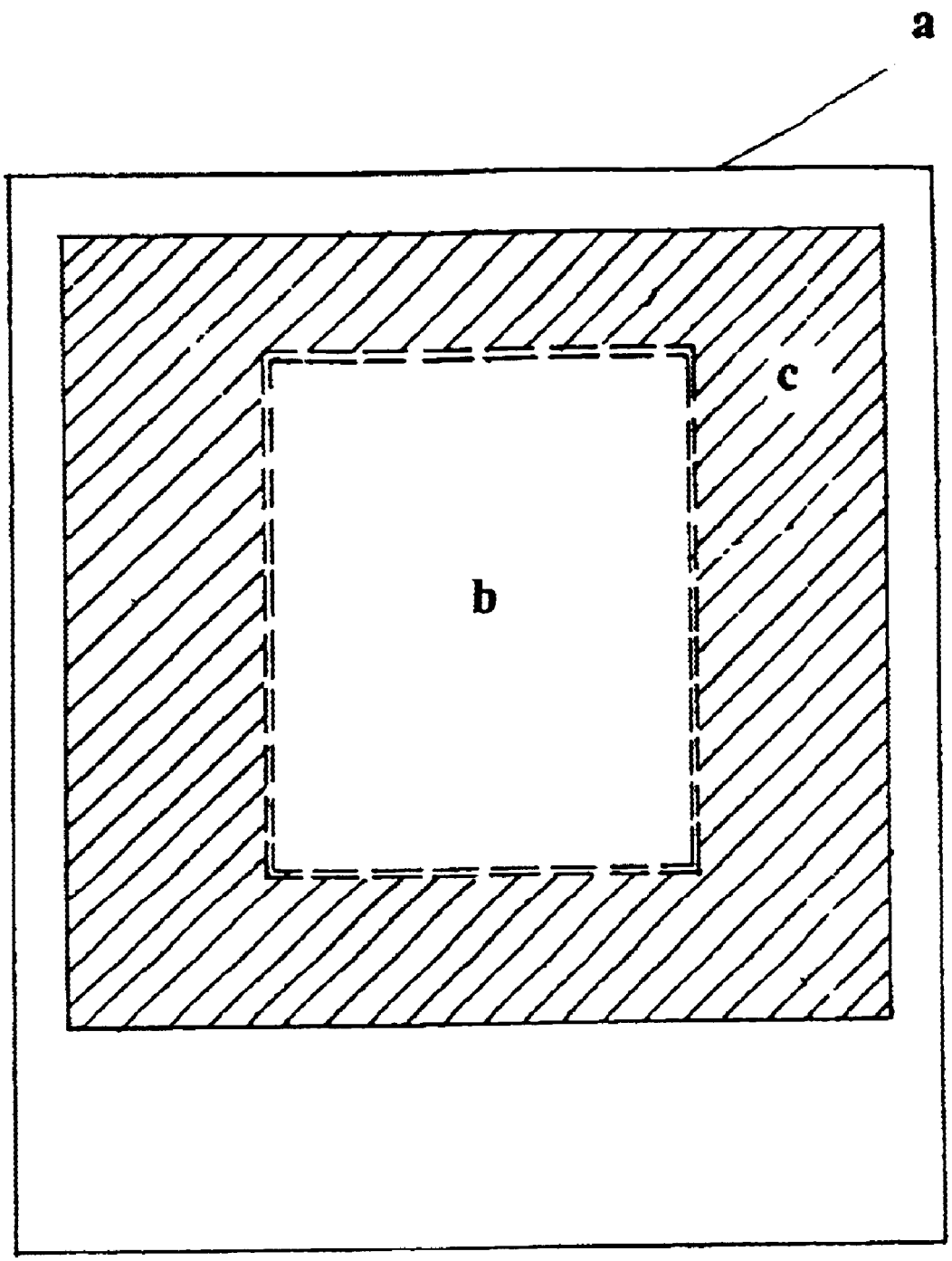
FIG. 1 is a drawing of a single film element according to the present invention.
Figure 2:
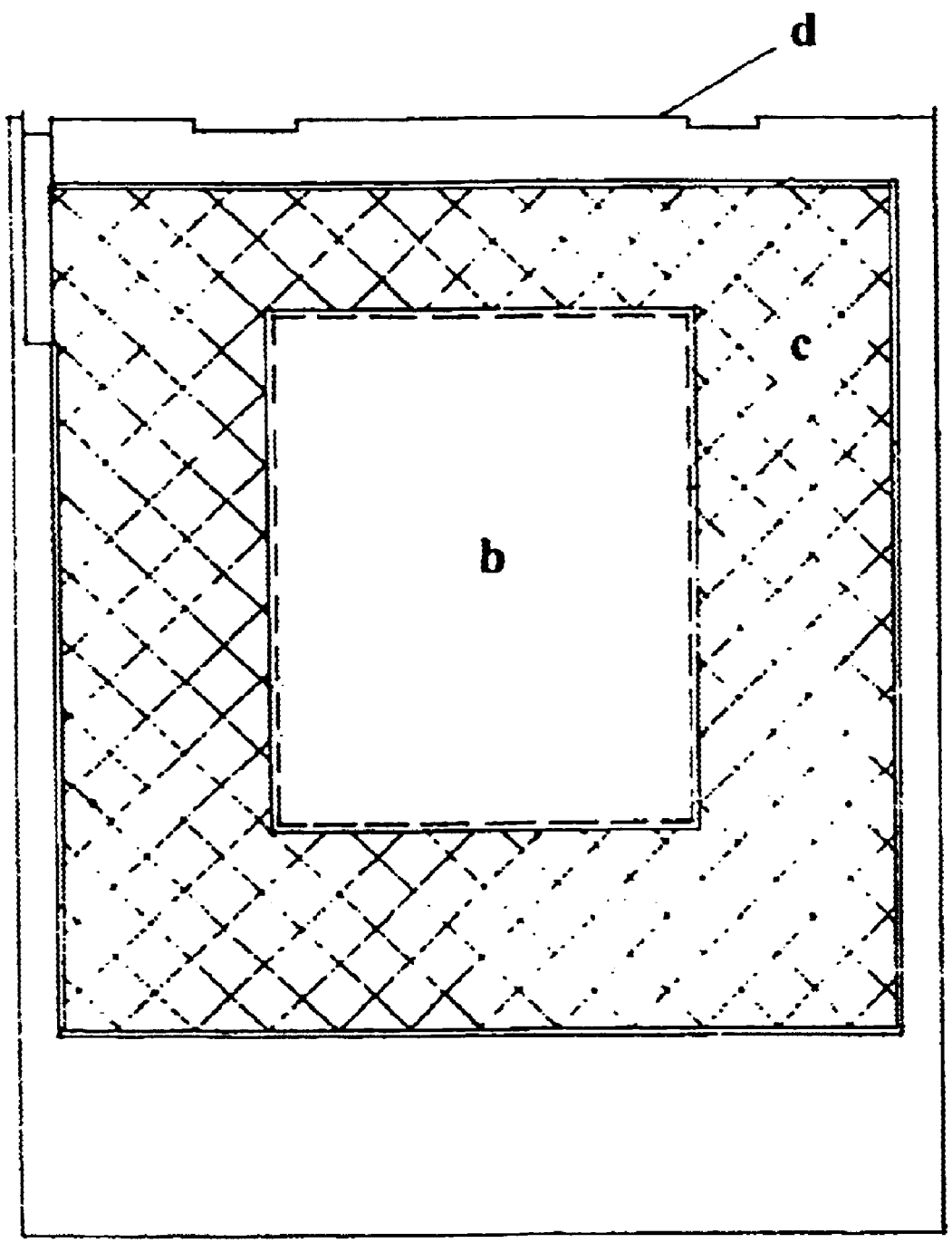
FIG. 2 is a drawing of a Polaroid-type film cassette according to the present invention.

This and other objects are realized in accordance with the present invention pursuant to which there is provided a sealed package of film d of FIG. 2, to be opened, put into a camera and exposed to form a plurality of photographs, comprising a plurality of film items to be exposed each film item comprising a first unexposed portion b of FIG. 1, and a second exposed portion c of FIG. 1, whereby upon exposure of the first unexposed portion and development there is formed in said first portion a picture corresponding to the exposure alongside a picture corresponding to the second portion.

Advantageously each second portion at least in part surrounds its first portion essentially as a frame c of FIG. 1.

Desirably each such second exposed portion in the package is not developed, and is later developed simultaneously when its first portion is developed following exposure. Alternatively, however, it is possible for the second exposed portions to have already been developed before packaging.

The film package is to take a plurality of photographs and it is possible for the second portions of the film items not all to be identical.

The invention is particularly applicable to instant developing film.

Specifically, the invention starts with conventional film of the conventional or instant variety, prior to packaging. It has a plurality of sites capable of producing a plurality of photographs.

However, prior to packaging, the unexposed film items are partially exposed in a manner which does not interfere with the ability of the unexposed parts later to be exposed in conventional manner. For example, the exposure might be of an encircling Christmas wreath.

The film, partially exposed, is then packaged and later exposed in conventional manner to form images in the unexposed portion, followed by developing in conventional manner. The newly exposed portion develops and, if not previously developed, the portion exposed before packaging is also developed, simultaneously.

The pre-exposure of the second portions, e.g. an enframing wreath, is easily effected in conventional manner. One can block the centers while not blocking the frame so that the film can again be exposed and only the unexposed centers will later pick up an image by exposure.

The pre-exposed portions can be identical or different in the several frames making up the film package. Thus for Christmas ornamentation different wreaths could be provided on each frame making up the package. Alternatively, different floral borders can be provided.

As noted, the invention is particularly applicable to instant film packages of the Polaroid type d of FIG. 2. One could purchase a package geared for Christmas or July 4th or a warm vacation, or the like, directly producing framed photographs.

It will be appreciated that the instant specification and claims are set forth by way of illustration and not limitation, and that various modifications and changes may be made without departing from the spirit and scope of the present invention.

What is claimed is:

1. A sealed package of film to be opened, put into a camera and exposed to form a plurality of photographs, comprising a plurality of film items to be exposed, each film item comprising a first unexposed portion and a second exposed portion, whereby upon exposure of the first unexposed portion and development there is formed in said first portion a picture corresponding to the exposure alongside a picture corresponding to the second portion.

2. A sealed package of photographic film comprising a plurality of exposable photographic frames to be exposed, each exposable photographic frame comprising a first unexposed portion and a second exposed portion, said sealed package of photographic film being outside of a camera.

3. A package according to claim 2, wherein each second portion at least in part surrounds its first portion.

4. A package according to claim 3, wherein the package is of instant developing film, each second portion being undeveloped in the package.

5. A package according to claim 3, wherein the second exposed portions of the several film items are not all identical.

6. A package according to claim 2, wherein each second exposed portion in the package is not developed.

7. A package according to claim 2, wherein the package is of instant developing film.

8. A package according to claim 2, wherein the second exposed portions of the several film items are not all identical.

9. A process for obtaining a developed photograph comprising:

a) providing a sealed package of photographic film outside of a camera as claimed in claim 1;
   b) opening the sealed package of film and removing the film therein;
   c) placing the film into a camera;
   d) exposing a photographic frame of said film while in said camera; and
   e) developing said exposed photographic frame.

10. A process according to claim 9, wherein each second portion at least in part surrounds its first portion.

11. A process according to claim 10, wherein the second exposed portions of the several film items are not all identical.

12. A process according to claim 9, wherein each second exposed portion in the package is not developed, and is later developed simultaneously when its first portion is developed following exposure.

13. A process according to claim 9, wherein the package is of instant developing film.

14. A process according to claim 9, wherein the package is of instant developing film, each second portion being undeveloped in the package and being later developed simultaneously when its first portion is developed following exposure.

15. A process according to claim 9, wherein the second exposed portions of the several film items are not all identical.

* * * * *